(No Model.)
C. H. HOPKINS.
ATTACHING PLANT SHIELDS TO CULTIVATORS.
No. 293,465. Patented Feb. 12, 1884.
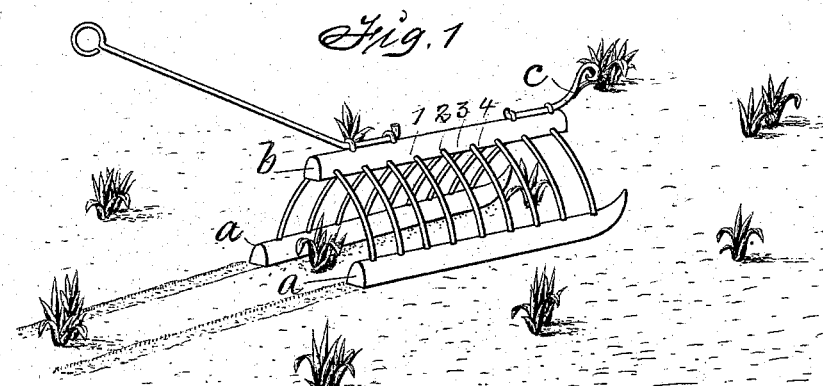
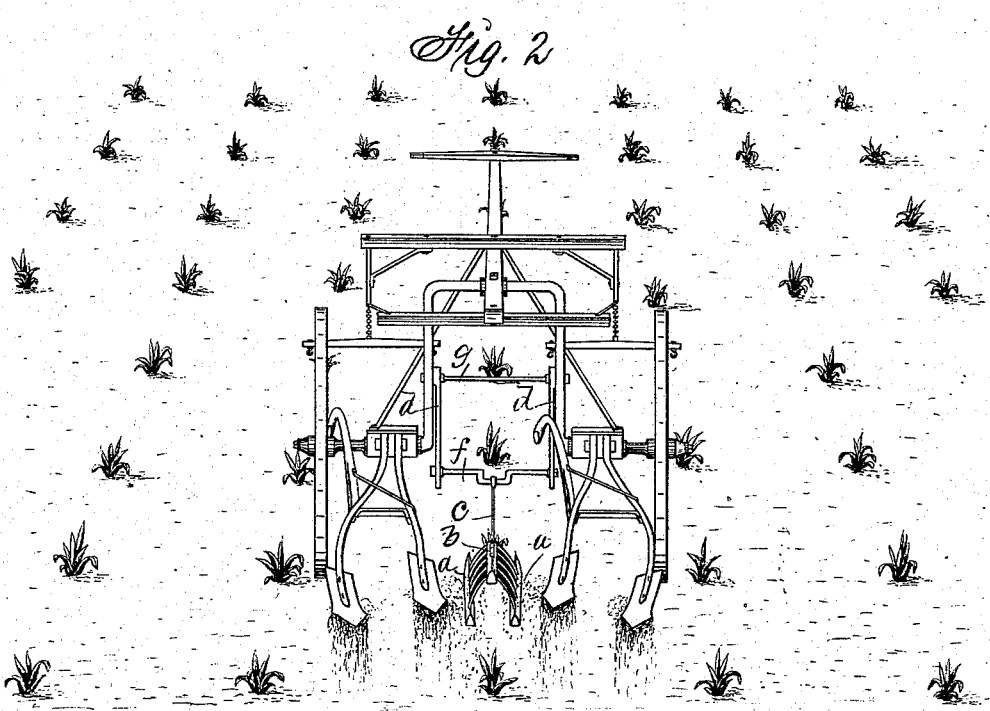
Witnesses:
H. A. Stoltenberg
D. S. Devin
Inventor:
Charles H. Hopkins,
By Thomas G. Orwig, Atty.

UNITED STATES PATENT OFFICE.

CHARLES H. HOPKINS, OF DE SOTO, ASSIGNOR OF ONE-HALF TO H. S. BUTLER, OF DES MOINES, IOWA.

ATTACHING PLANT-SHIELDS TO CULTIVATORS.

SPECIFICATION forming part of Letters Patent No. 293,465, dated February 12, 1884.

Application filed July 23, 1883. (No model.)

*To all whom it may concern:*

Be it known that I, CHARLES H. HOPKINS, of De Soto, in the county of Dallas and State of Iowa, have invented an Improvement in Attaching Plant-Shields to Cultivators, of which the following is a specification.

My invention relates to the manner of combining a plant-shield with a cultivator. Heretofore a shield adapted in form to stride a row of plants has been rigidly fixed to a cultivator in such a manner that it had to move vertically and laterally with the plows or shovels on the opposite sides of the row of plants, and when the row of plants was not straight, or the cultivator plows or shovels deviated from a straight line when the rows of plants were straight, the plant-shield, moving jointly with the plows or shovels, would come in contact with the plants to crush and damage them.

My improvement consists in attaching the plant-shield to the carriage of a straddle-row cultivator, as hereinafter fully set forth, in such a manner that it will not be affected by the lateral motions of the cultivator-frames, plows, or shovels on its opposite sides, but will be dragged on the ground, and advanced midway and parallel with the tracks of the carriage-wheels as required, and will move directly over the plants to protect them from the matter thrown toward them by the plows or shovels, and will also allow the cultivator-frames and the plows or shovels fixed thereto on the opposite sides of the plants, to be moved independently relative to each other, as is often necessary in the varying conditions of soil, different kinds of weeds, and obstructions that may be met as the complete machine is advanced astride of a row of plants.

Figure 1 of my accompanying drawing is a perspective view of traveling cage and plant-shield. Fig. 2 shows it attached to a cultivator. Together these figures clearly illustrate the construction, application, and operation of my complete invention.

$a$ $a$ are runners, preferably made of hard wood, about thirty (30) inches long, flat on their bottoms, and rounded or beveled off at the edges on their top sides.

$b$ is a straight bar of corresponding length. 1 2 3 4 represent a series of bent wires or rods fixed to the runners and bar to produce an open-bottomed and open-ended cage that is adapted to be placed astride of a row of plants. The arched wires or rods are fixed to the sides of the runners $a$, and to the center of the bar $b$ by means of staples, or in any suitable way. They are graduated in length, so as to make the front end and mouth of the device about ten (10) inches wide, and the rear end opening about seven (7) inches, so that the heels of the runners $a$ will come closer to the plants than their front ends.

$c$ is a hook fixed to the front end of the bar $b$, to adapt the complete device to be flexibly and detachably connected with a cultivator.

$d$ $d$ are the side bars, and $f$ the cross-piece, of a frame that is suspended to the axle or carriage-frame of a cultivator by means of a rod, $g$, or in any suitable way, in such a manner that the traveling cage and plant-shield can be readily attached to the center of the bar $f$ of the pendent frame, to be dragged midway between the cultivator-shovels and directly in line with a row of plants, to cover and protect each plant, as the cultivator is advanced, from being damaged by clods of earth, stones, or rubbish that might be thrown upon them by the plows or shovels on the opposite sides of the plants. The fine dirt or soil thrown toward the plants and against the opposite sides of the cage at the same time will fall through between the series of arched rods or bars 1 2 3 4, and get distributed around between the small plants by the movements of the bars and runners, as required to stimulate the growth of the plants.

I claim as my invention—

The combination of a rigid plant-shield and a pendent frame with the carriage of a straddle-row cultivator, to operate in the manner set forth, for the purposes specified.

CHARLES H. HOPKINS.

Witnesses:
E. H. HAYCRAFT,
W. E. GARRETT.